US006009459A

United States Patent [19]
Belfiore et al.

[11] Patent Number: 6,009,459
[45] Date of Patent: Dec. 28, 1999

[54] INTELLIGENT AUTOMATIC SEARCHING FOR RESOURCES IN A DISTRIBUTED ENVIRONMENT

[75] Inventors: Joseph D. Belfiore, Redmond; Satoshi Nakajima, Bellevue; Chee H. Chew, Redmond, all of Wash.

[73] Assignee: Microsoft Corporation, Redmond, Wash.

[21] Appl. No.: 08/781,655

[22] Filed: Jan. 10, 1997

[51] Int. Cl.⁶ .............................. G06F 13/00; G06F 17/00
[52] U.S. Cl. .............................................. 709/203; 707/10
[58] Field of Search .................................. 707/3, 4, 5, 10; 395/200.47, 200.48, 200.49, 200.31, 200.32, 200.33; 709/201–203, 217–219

[56] References Cited

U.S. PATENT DOCUMENTS

| | | | |
|---|---|---|---|
| 4,774,655 | 9/1988 | Kollin et al. ................................. | 707/4 |
| 5,594,910 | 1/1997 | Filepp et al. ........................ | 395/800.28 |
| 5,649,186 | 7/1997 | Ferguson .................................... | 707/10 |
| 5,659,729 | 8/1997 | Nielsen ....................................... | 707/3 |
| 5,659,732 | 8/1997 | Kirsch ........................................ | 707/5 |
| 5,706,507 | 1/1998 | Schloss .................................... | 707/104 |
| 5,768,578 | 6/1998 | Kirk et al. .............................. | 707/100 |
| 5,907,680 | 5/1999 | Nielsen .................................... | 709/228 |

OTHER PUBLICATIONS

Gralla, P., How Intranets Work, Ziff–Davis Press, pp. 4–5, 1996.
Gralla, P., How the Internet Works, Ziff–Davis Press, pp. 248–51, Jun. 1996.
Larrondo–Petrie et al., "A Domain Analysis of Web Browser Architectures, Languages and Features," Proc. of Southcon/96, IEEE, pp. 168–174, Jun. 1996.
"Leading browsers get search engines," InfoWorld, vol. 18 (33), Aug. 12, 1996, p. 3(1).
"CMP's Interactive Age Digital Web Site Features Breaking News On Netscape and Microsoft," PR Newswire, Aug. 8, 1996, p. 808.
"Netscape Navigator Gold for Windows Beta Release 4," Press Release Notes From Netscape, Oct. 2, 1996, pp. 1–21.
Fontana, John, and Paul Kapustka, "Web Feud Gets Nastier Still," Communications Week, No. 623, Aug. 12, 1996, p. 1 and 78.

*Primary Examiner*—Ahmad F. Matar
*Assistant Examiner*—Andrew Caldwell
*Attorney, Agent, or Firm*—Christensen O'Connor Johnson & Kindness PLLC

[57] ABSTRACT

Searches are automatically initiated to intelligently locate resources, particularly World Wide Web sites, within a distributed environment in response to a user specifying text via a user interface element. In a particular embodiment, a Web browser is enhanced to include a browser search capability. The browser includes a text box allowing the user to enter a URL. Depending on the particular browser used in the embodiment, this text box may be called, among other things, a destination field, location field, or URL field. When the user enters a valid URL, the corresponding web site is accessed. If the user enters text that is not a URL, the system may first try to construct a valid URL from the user-entered text. If a valid URL cannot be constructed, the browser then automatically formats a search engine query using the user-entered text and forwards the query to an Internet search engine. The browser chooses a particular search engine by determining the meaning or category of the user-entered text. The search engine locates web pages containing the query terms and either (1) returns a list of the search results or (2) redirects the user's browser to the most relevant web site discovered in the search. The browser may modify a returned web page to highlight search terms used in the query.

51 Claims, 17 Drawing Sheets

INTELLIGENT AUTOMATIC SEARCHING FOR RESOURCES IN A DISTRIBUTED ENVIRONMENT

TECHNICAL FIELD

The present invention relates generally to data processing systems and more particularly to intelligent automatic searching for computer resources in a distributed environment.

BACKGROUND OF THE INVENTION

Distributed computing environments are becoming ever increasingly popular. Usage of the Internet has become especially popular. Typically, a user accesses the Internet from a client computer 10 (FIG. 1) that runs a web browser 14. The web browser includes software that enables a client computer to communicate with servers on the Internet. In most Internet transactions, a user sends a request 16 from the client computer 10 to a server computer 18 that is located on the Internet. The request 16 identifies a web site on the server 18 that the user wishes to access. In response to the request 16, the server 18 returns a copy of a web page 20. In most instances, the web page 20 is in the Hypertext Markup Language (HTML) and includes hyperlinks to other web sites. The web browser 14 includes software for rendering the web page 20 on the client computer 10 so that the user may view the web page.

The above described transaction is performed using the Hypertext Transfer Protocol (HTTP). In HTTP, the request from the client to the server includes the method to be applied to the resource that is requested, an identifier of the resource and the protocol version in use. Thus, for example, a typical request may request a "GET" of a web page that is identified by an identifier (e.g., a uniform resource locator (URL)). The protocol version in the request typically identifies which version of HTFP is being utilized. A URL is a compact string representation for a resource that is available on the Internet. In general, a URL is written as follows: [<scheme>:<scheme-specific-part>]. The <scheme> portion of the URL identifies which scheme is being utilized. Among the better known schemes are File Transfer Protocol (FTP), Hypertext Transfer Protocol (HTTP), the Gopher Protocol, Wide Area Information Servers (WAIS), USENET News Protocol (News) and the Prospero Directory Service (Prospero).

Perhaps the most popular format of a URL is a URL for the HTTP scheme. An HTTP URL takes the form of http://<host>:<port>/<path>?<searchpart>. The <host> portion may contain a fully qualified domain name of the network host. The <port> portion of the URL identifies a port number to connect to and defaults to 80 if omitted from the URL. The <path> portion of the URL is an HTTP selector. In general, an HTTP selector is a path name. The <searchpart> is a query string that is optional.

As mentioned above, web pages are typically encoded in HTML. HTML is a simple markup language that is used to create Hypertext documents that are platform independent. An HTML document is delimited into elements by tags that specify headings, paragraph lists, links, etc. Most HTML elements are identified in a document by a start tag that gives the element names and attributes, followed by a content, followed by an end tag. Start tags are delimited by "<" and ">". In contrast, end tags are delimited by "</" and ">". Typically, web browsers include code for translating and rendering HTML documents to a displayable format.

Microsoft Internet Explorer 2.0 is an example of a web browser. It enables a user to access a particular web page by typing the URL for the web page in an Address box. FIG. 2 shows an example of the window 22 for Internet Explorer 2.0 and the associated Address box. The web page contents associated with the URL and the Address box 24 are displayed within the client area 26 of the Internet Explorer window 22. The one difficulty with this mechanism is that users often cannot remember the URL for the web page they seek or enter the URL improperly in the Address box 24. As a result, the associated web page cannot be retrieved and displayed.

SUMMARY OF THE INVENTION

In accordance with the present invention, a method for automatically initiating a search for a resource such as a web site when a user has specified (entered) text that is not a valid identifier for the resource, e.g., a uniform resource locator (URL). A heuristic analysis is employed to determine when text entered by the user is presented in the format of a valid identifier such as a URL. When the entered text is determined to not have a valid URL format, the text may be placed in a template to identify/determine the meaning of the entered text.

In accordance with other aspects of the present invention, the method provides for determining at least one of a plurality of search engines most suited to search for web sites related to the entered text's determined meaning. The determined search engine will attempt to locate and return information (media) from at least one web site that closely relates to the determined meaning of the entered text.

In accordance with yet other aspects of the present invention, the method provides :for highlighting occurrences of the searched text in a web page that corresponds to the web site returned by the determined search engine. The user may specify the text by entering the text in a text box for a web browser.

In accordance with still other aspects of the present invention, the method provides for automatically determining a meaning of this text when the period of time to access information at a location identified by entered text in a valid identifier format has exceeded a predetermined value. The determined meaning of the entered text in the valid identifier format is passed to a search engine that is determined to be suited to locate web sites related to the entered text's determined meaning.

In accordance with other aspects of the present invention, the method provides for a registry that categorizes the specific suitability of a plurality of search engines to locate web sites related to a determined meaning of the specified text. A script may be used to perform an event relative to the related web site.

In accordance with yet other aspects of the present invention, the method provides for automatically deleting prefix terms in the specified text that are identified as not necessary to perform a search based on the determined meaning of the entered text.

In accordance with other aspects of the present invention, the method provides for a template to produce a valid URL by prepending a predetermined text string to a portion of the entered text.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

BRIEF DESCRIPTION OF THE DRAWINGS

A preferred embodiment of the present invention will be described below relative to the following figures.

DETAILED DESCRIPTION OF THE INVENTION

The preferred embodiment of the present invention provides an intelligent mechanism for automatically initiating a search when a user enters text that cannot be properly interpreted as a URL. In particular, the preferred embodiment of the present invention includes an Address box in which a user may enter a URL to access a particular web site. The system determines whether the text the user enters within the Address box is a proper URL by applying heuristics. When the system determines that the text entered in the Address box is not a proper URL, the system processes the text and puts the resulting text into a template in the registry. The template serves as a vehicle for passing the search terms to a search engine that may return a list of search results that include hyperlinks to associated web pages or may return a highest scoring web page from among those web pages located in the search by the search engine.

In some embodiments of the present invention, the returned web pages may include highlighting where the search terms passed to the search engine are highlighted within the returned web pages. More generally, code at a client computer may open and manipulate the returned web pages. When search results are returned to the client, the search results may be displayed on a dedicated web page or as part of another type of user interface element. For example, the search results may be displayed within a menu that enables a user to select among the web pages returned in the search results.

In another alternative embodiment, the passing of search terms to the search engine is not triggered by an improper URL being entered but rather is triggered by the failure to resolve the URL to a web site within a certain time frame. In some instances, a user may enter a properly constructed URL (i.e., one with a proper syntax) but the URL may refer to a nonexistent page or a heavily used page that cannot be quickly resolved. In such an instance, the URL may be passed to the search engine to determine what the user intended to access.

The present invention provides a mechanism for a computer system to automatically and intelligently determine what a user intended when the user entered text within an Address box or other user interface element. Often users improperly enter URLs or enter search terms in a user interface element that requires URLs. The present invention identifies many such instances and automatically retrieves information regarding appropriate web sites so that the user can gain access to the desired web site. The present invention does not require added effort from the user and helps to increase the resilience of the system to user input errors.

Figure 1:
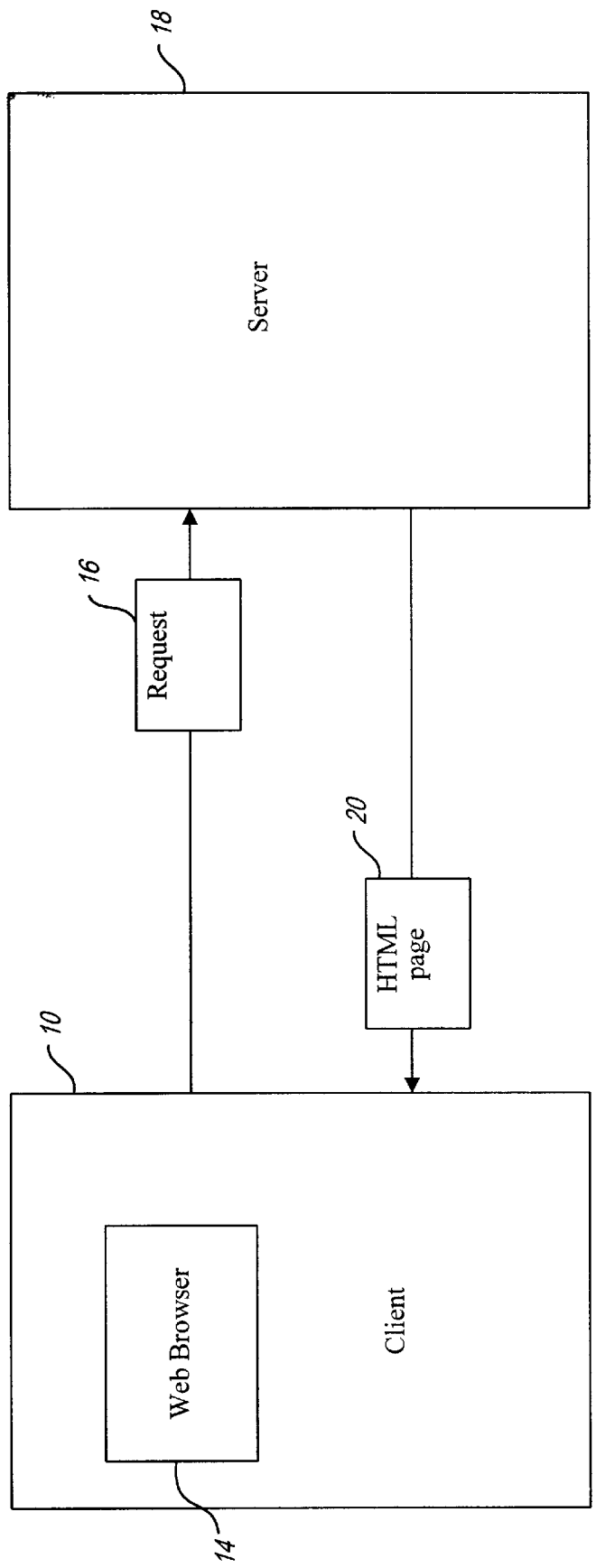
FIG. 1 is a block diagram illustrating an example of conventional components involved in a typical Internet transaction.
Figure 2:
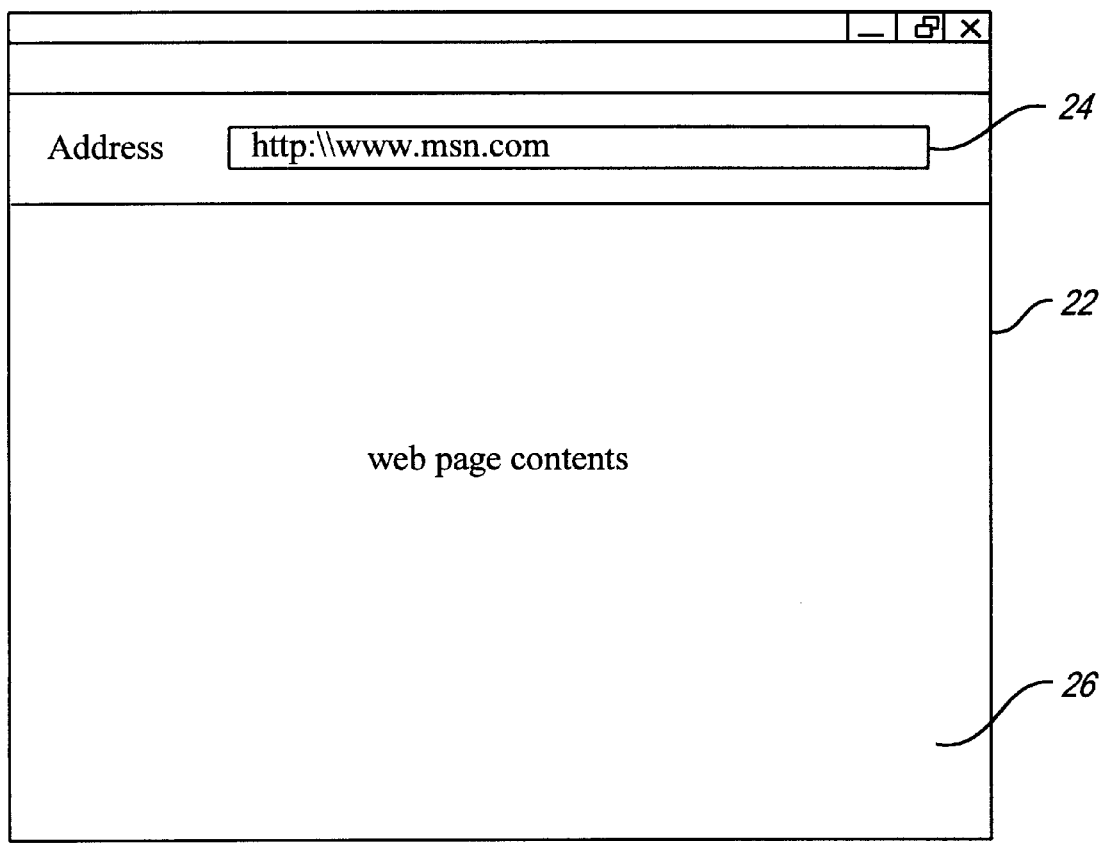
FIG. 2 is a diagram depicting the Address box used in a conventional web browser.
Figure 3:
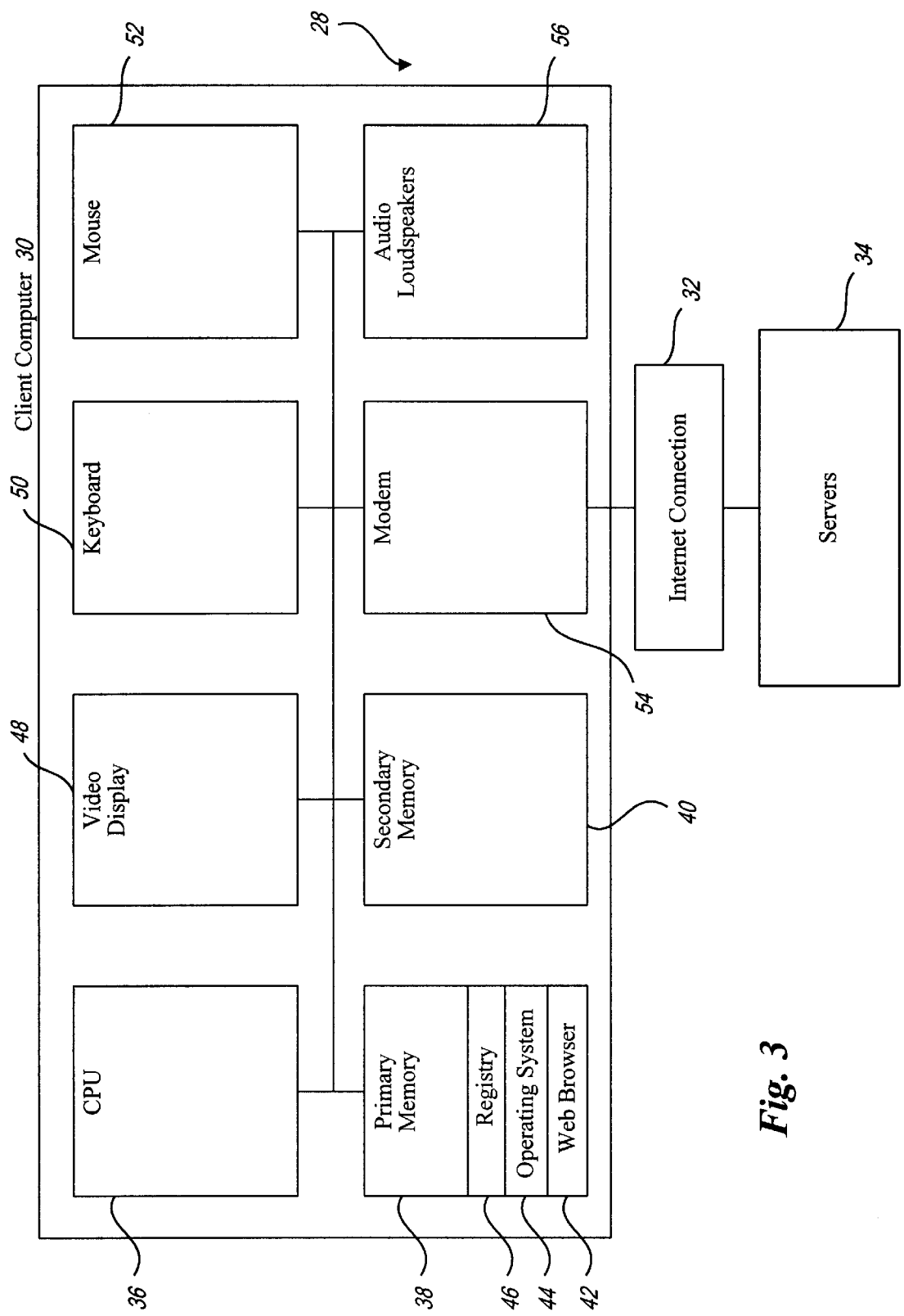
FIG. 3 is a block diagram illustrating a computing environment that is suitable for practicing the preferred embodiment of the present invention.

FIG. 3 is a block diagram that shows a computing environment 28 that is suitable for practicing the preferred embodiment of the present invention within this environment 28, client computer 30 is connected with servers 34 via Internet connection 32. The role of the servers 34 will be discussed in more detail below. The client computer 30 includes a central processing unit (CPU) 36 that has access to a primary memory and a secondary memory 40. The primary memory holds a copy of a web browser 42 For purposes of the discussion below, it is assumed that the web browser is the Microsoft Internet Explorer web browser produced by Microsoft Corporation of Redmond, Wash. The primary memory also holds a copy of an operating system 44, such as the Microsoft® Windows® 95 operating system sold by Microsoft Corporation. The primary memory additionally holds a registry 46 that holds registered configuration information. The client computer 30 may also include a number of input/output devices, including video display 48, keyboard 50, mouse 52, a modem 54 and audio loudspeakers 56.

Those skilled in the art will appreciate that the computer environment 28 shown in FIG. 3 is intended to be merely illustrative. The present invention may also be practiced in other computing environments. For example, the present invention may be practiced in multiple processor environments wherein the client computer includes multiple processors. Moreover, the client computer need not include all of the input/output devices shown in FIG. 3 and may also include additional input/output devices. Those skilled in the art will appreciate that the present invention may also be practiced with intranets and more generally in distributed environments in which a client computer requires resources from a server computer.

Figure 4:
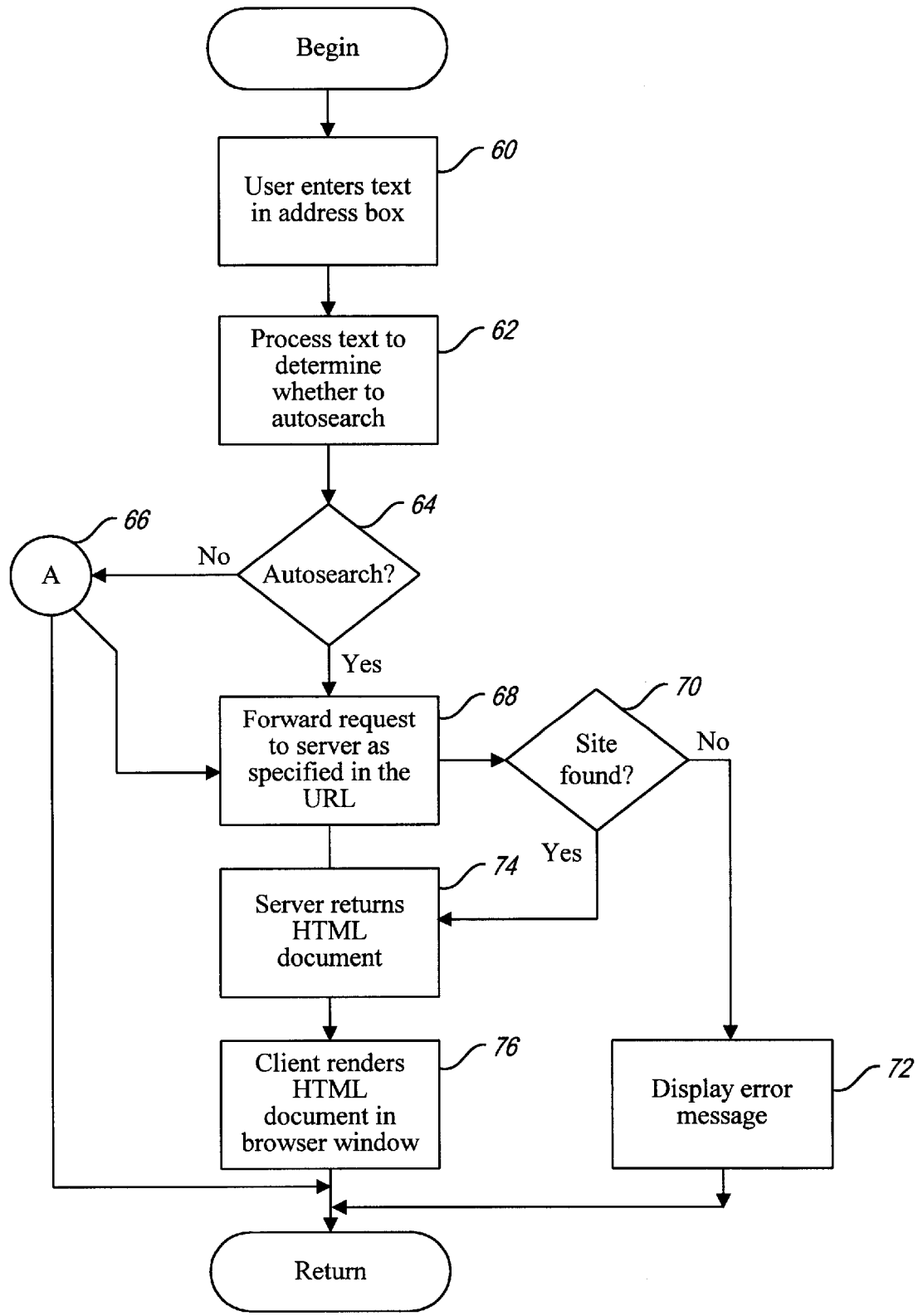
FIG. 4 is a flowchart illustrating an overview of the steps performed by the preferred embodiment of the present invention.
Figure 5:
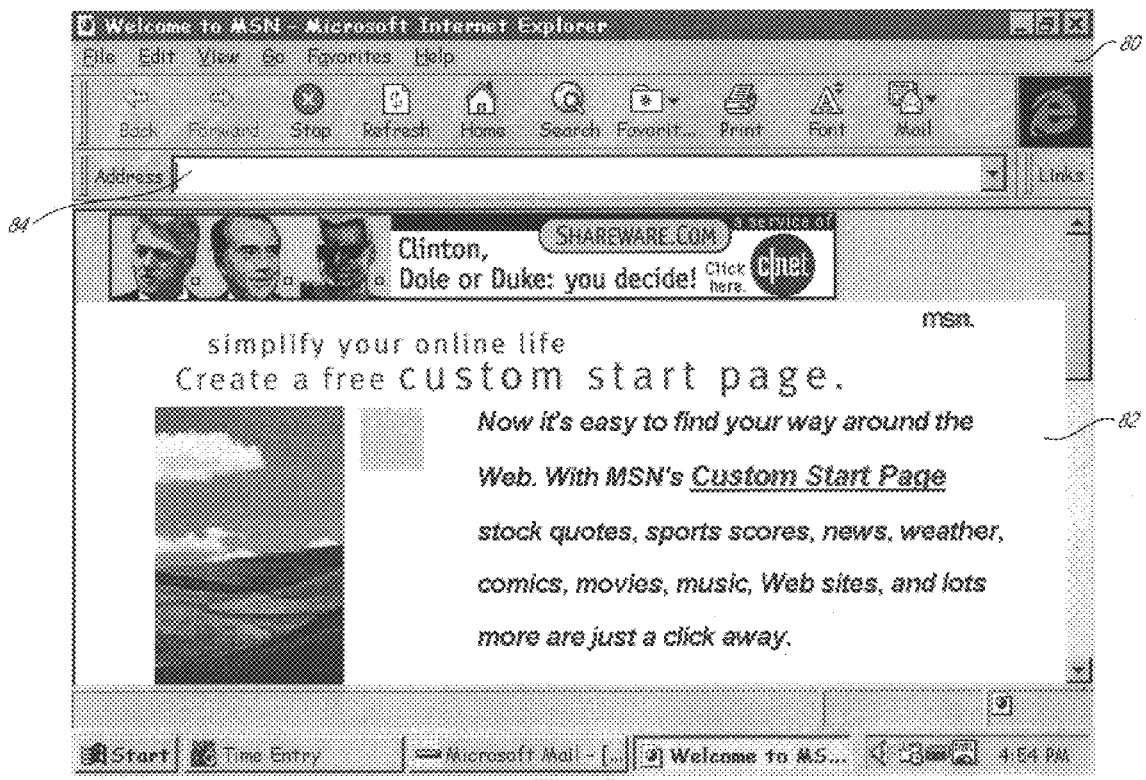
FIG. 5 illustrates an example of the user interface provided by the web browser in the preferred embodiment of the present invention.
Figure 6:
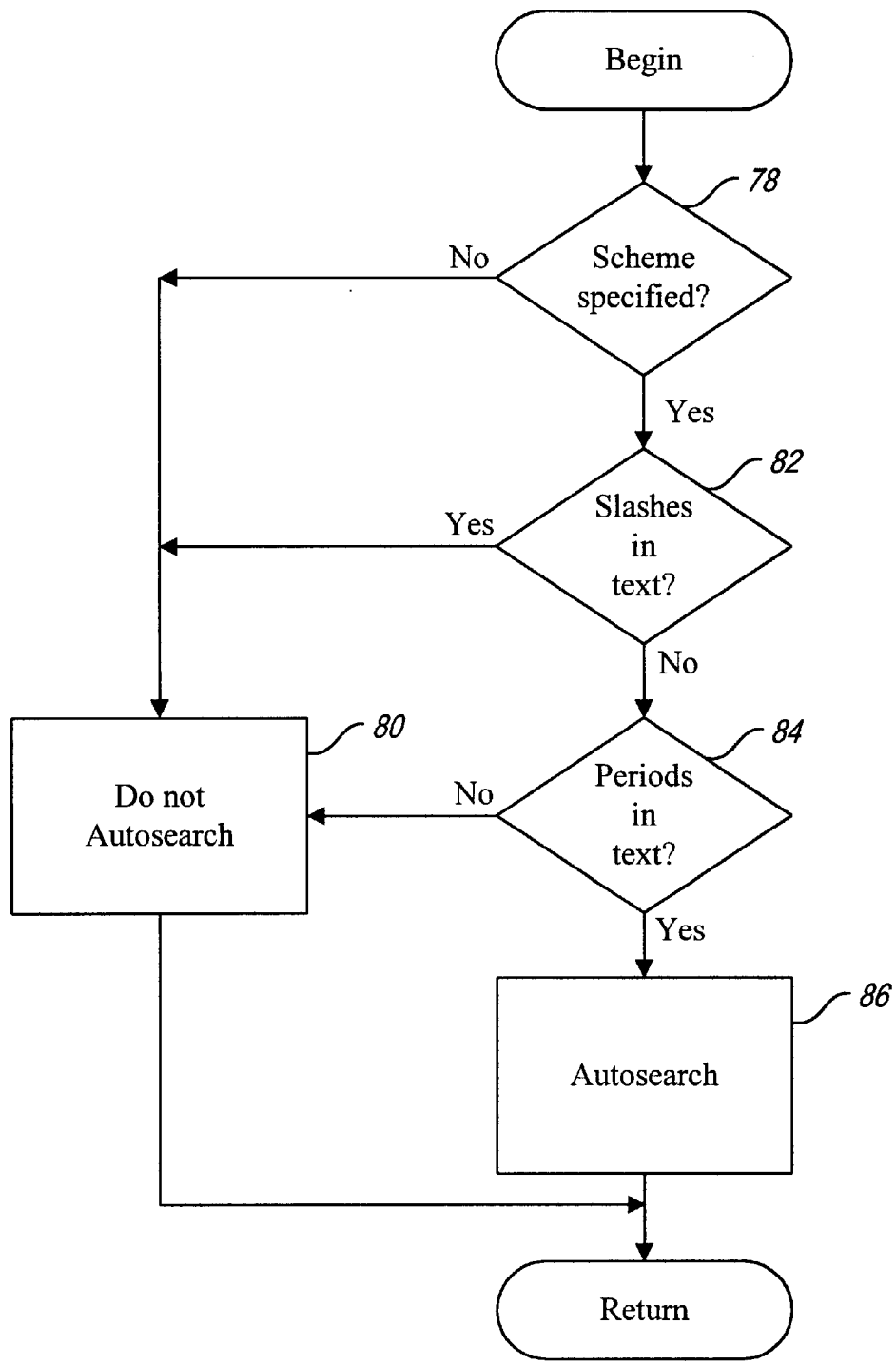
FIG. 6 is a flowchart illustrating how it is determined that text entered by a user in the Address box is not a URL.

FIG. 4 is a flowchart that provides an overview of the steps performed by the preferred embodiment of the present invention. Additionally, a user has entered a window associated with the web browser 42. FIG. 5 shows an example of such a web browser window 80. The web browser window 80 includes an Address box 84 that is a text box in which a user may enter text. A user enters text in the Address box 84 (step 60 in FIG. 4). The web browser 42 then processes the text entered by the user to determine if an "Autosearch" needs to be initiated because the text is not a valid URL (step 62 in FIG. 4). The "Autosearch" entails passing a processed version of entered text to a search engine to obtain search results or a given web page, as will be described in more detail below. FIG. 6 is a flowchart that illustrates the steps that are performed to determine if an "Autosearch" is warranted or not (i.e., step 62). The web browser 42 checks whether a scheme is specified within the URL (step 78 in FIG. 6). For example, most URLs entered within the Address box will begin with the prefix "http://". This prefix specifies HTTP as the scheme that is being used. If such a scheme is specified within the URL, it is concluded that an Autosearch is not warranted (step 80 in FIG. 6). The web browser 42 then checks to see whether there are slashes in the text (step 82 in FIG. 6). Valid URLs will, in general, contain at least one slash. Thus, if there is at least one slash in the text, it is concluded that an Autosearch is not warranted (see step 80 in FIG. 6). The web browser 42 also checks whether there are any periods in the text (step 84 in FIG. 6). If the text includes a period, an Autosearch is not warranted. Otherwise, an Autosearch is warranted (step 86 in FIG. 6).

The next steps performed by the preferred embodiment depend upon whether an Autosearch is warranted or not (see step 64 in FIG. 4). If an Autosearch is not warranted, a request is forwarded to the server that is identified by the URL (i e., the text) to retrieve a web page (step 68 in FIG. 4). It should be appreciated that the web browser 42 may preprocess the text before sending the text out to the server. For example, if a scheme is missing, the web browser may add the prefix "http://" to the text or another scheme prefix. If the web site is found (see step 70), the server 34 returns an HTML document that encodes the requested web page (step 74 in FIG. 4). The client computer system 30 then renders the HTML document in the client area 82 (FIG. 5) of the web browser window 80 (step 76 in FIG. 4). The web browser 42 includes code for interpreting HTML documents. This code is utilized to render the web page in the client area 82 of the web browser window 80. If the web site specified by the URL is not found (step 70), an error message is displayed (step 72 in FIG. 4) that indicates that the web site could not be located. This error message may be displayed as a separate pop-up window that overlays a portion of the web browser window 80.

Figure 7:
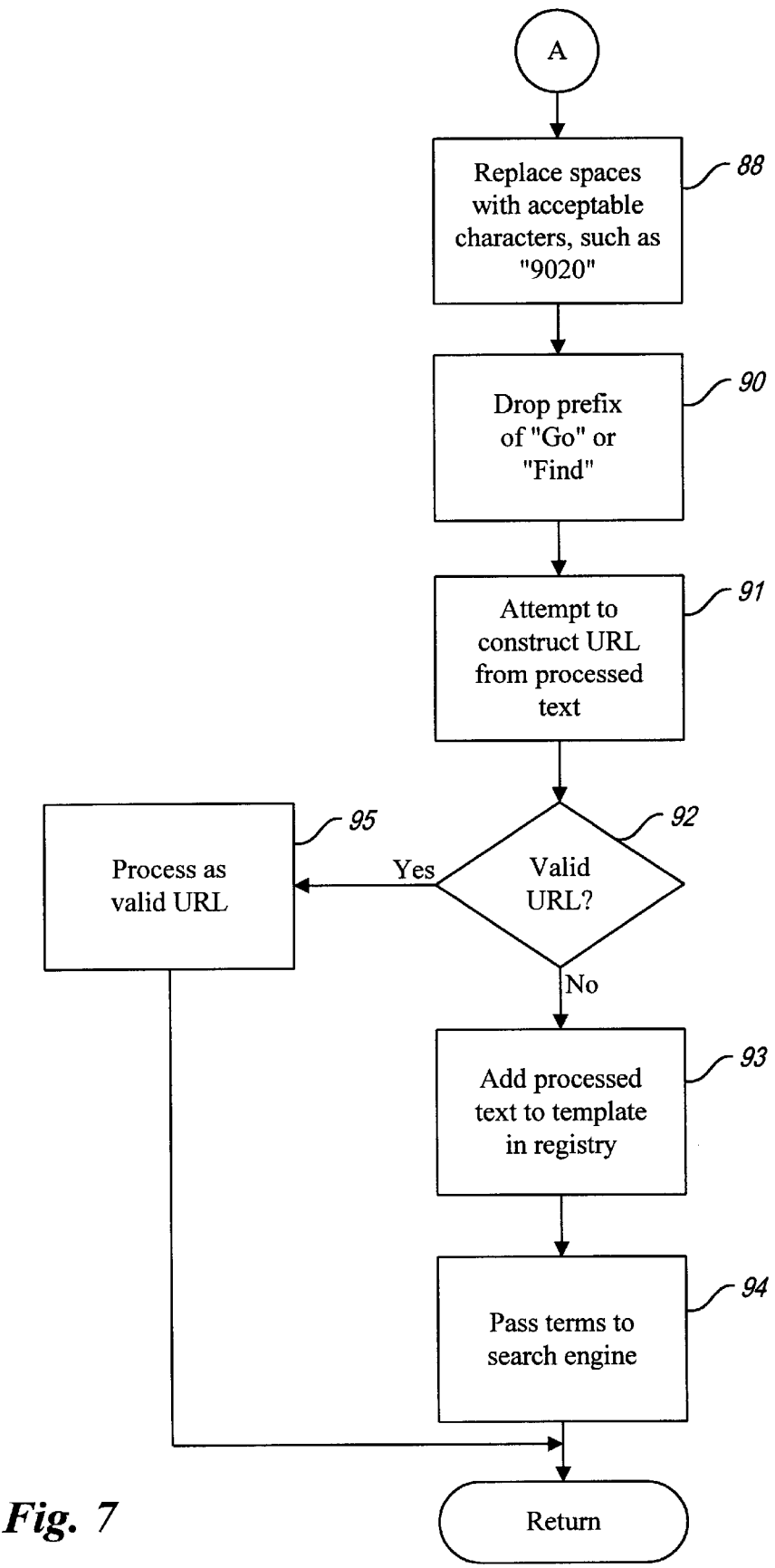
FIG. 7 is a flowchart illustrating the steps that are performed after it is determined that the text entered in the Address box is not a URL.

If it is determined in step 64 of FIG. 4 that an Autosearch is warranted, a whole different sequence of steps is performed. These steps are designated by circle 66 in FIG. 4. FIG. 7 illustrates in more detail the steps that are performed as part of step 66 of FIG. 4. The preferred embodiment first processes the text to remove illegal characters and extraneous information. As will be described in more detail below, the processed text will be passed to a search engine to locate web pages that correspond to the text entered by the user. With many search engines, a search query may not include spaces. As such, the preferred embodiment of the present invention replaces spaces in the text with acceptable characters. One example of an acceptable character string is %20. Thus, spaces may be replaced with "%20" (step 88 in FIG. 7).

Users may enter directive terms such as "go" or "find" followed by search terms within the Address box 84. Such users intend for the web browser to locate web pages that are identified by terms within the text. As the directive terms do not contain content that is useful in conducting a search, these prefix terms are dropped from the text (step 90 in FIG. 7).

Before initiating the Autosearch, an attempt is made to construct a valid URL from the processed text (step 91 in FIG. 7). This entails prepending a scheme prefix to the beginning of the processed text. For example, if the processed text begins with "www," the prefix "http://" is prepended to the beginning of the text. Similarly, the prefixes "ftp://" and "gopher://" may be prepended to the text if the text appears to be a portion of an FTP address or a Gopher address. It is then determined whether the resulting string constitutes a valid URL (step 92 in FIG. 7). If the string forms a valid URL, then the string is processed as a valid URL (step 95 in FIG. 7), which entails performing the steps beginning at step 68. Otherwise, the processed text without the prepended scheme prefix is readied for the Autosearch.

The processed text that has the identified prefixes removed and spaces replaced with acceptable characters is then added to a template within the registry 46 (step 93 in FIG. 7). The template is an entry in the registry 46 that includes replaceable characters that may be replaced with the processed text. An example template registry entry that causes the Yahoo! search engine to be called is "http://msie.yahoo.com/autosearch?%s". The %s is filled in with information regarding the search terms. The web browser 42 uses the resulting URL to pass the search terms to the appropriate search engine to initiate the Autosearch (step 94 in FIG. 7). As will be described in more detail below, the web browser may call multiple search engines in such a fashion or may, alternatively, call different search engines depending upon the nature of the text that is entered. In one alternative, the search terms are passed to multiple search engines to return separate sets of search results that may be separately displayed or combined into a single set of search results.

Figure 8A:
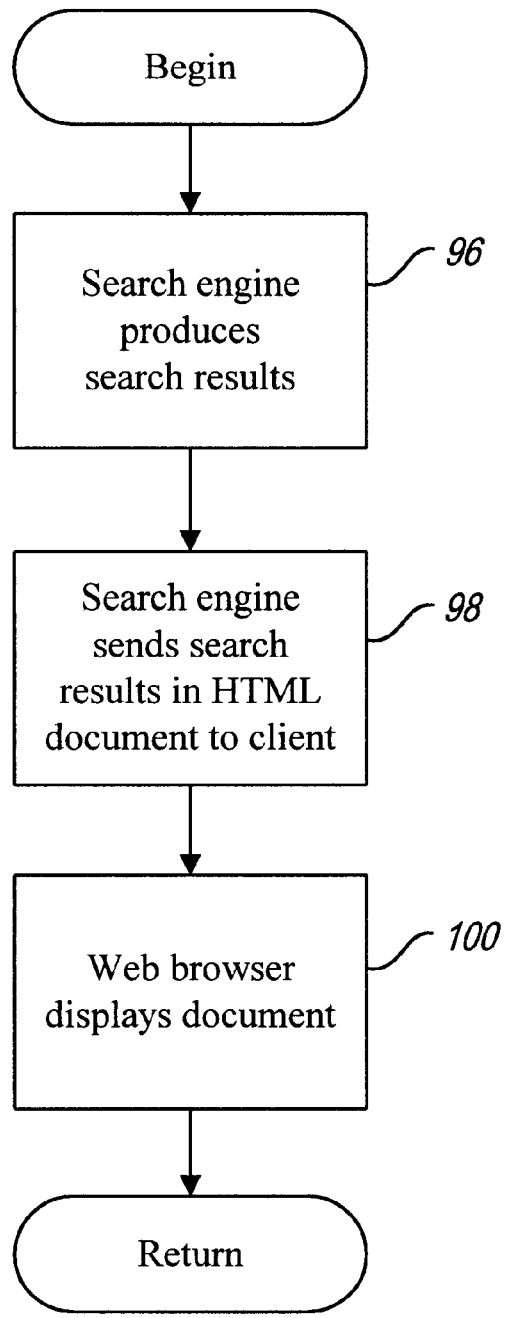
FIG. 8A is a flowchart illustrating the steps performed when the search engine returns search results in response to the user entering text in the Address box that is not a URL.
Figure 10A:
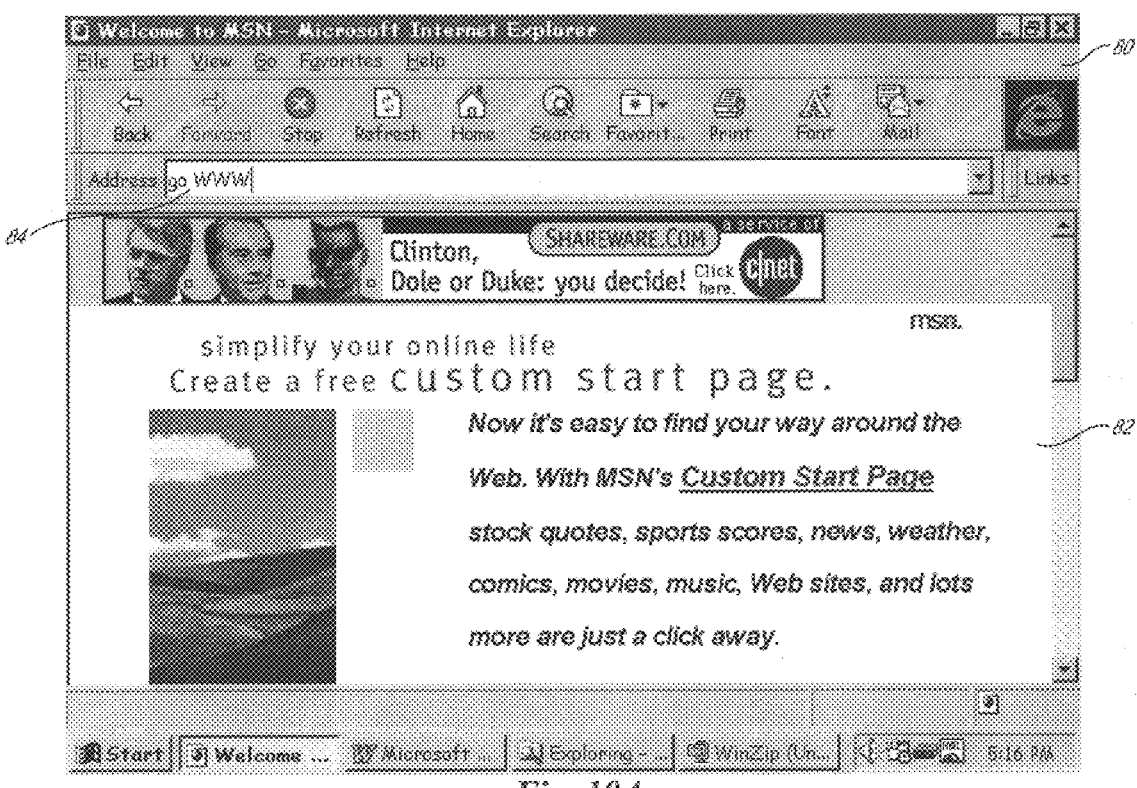
FIG. 10A illustrates the web browser user interface where a user has entered "go WWW" in the Address box.
Figure 10B:
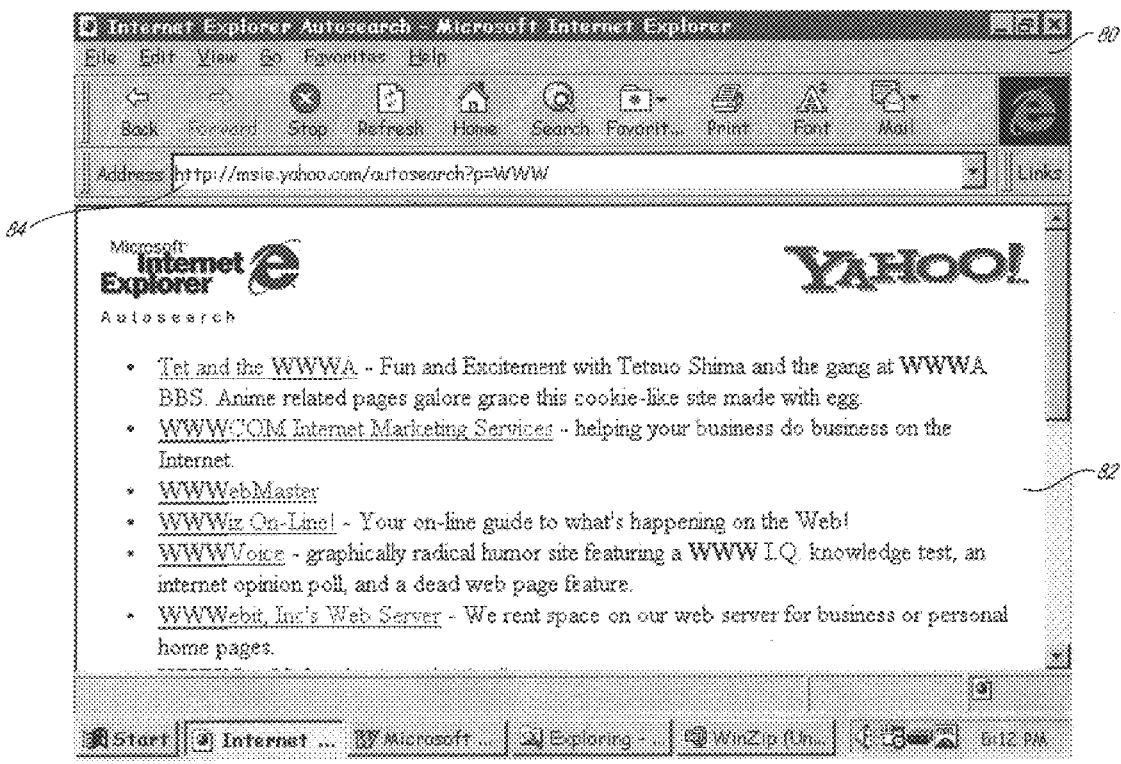
FIG. 10B illustrates an example of the web browser user interface after search results have been returned in response to the text shown in FIG. 10A being entered in the Address box.
Figure 11A:
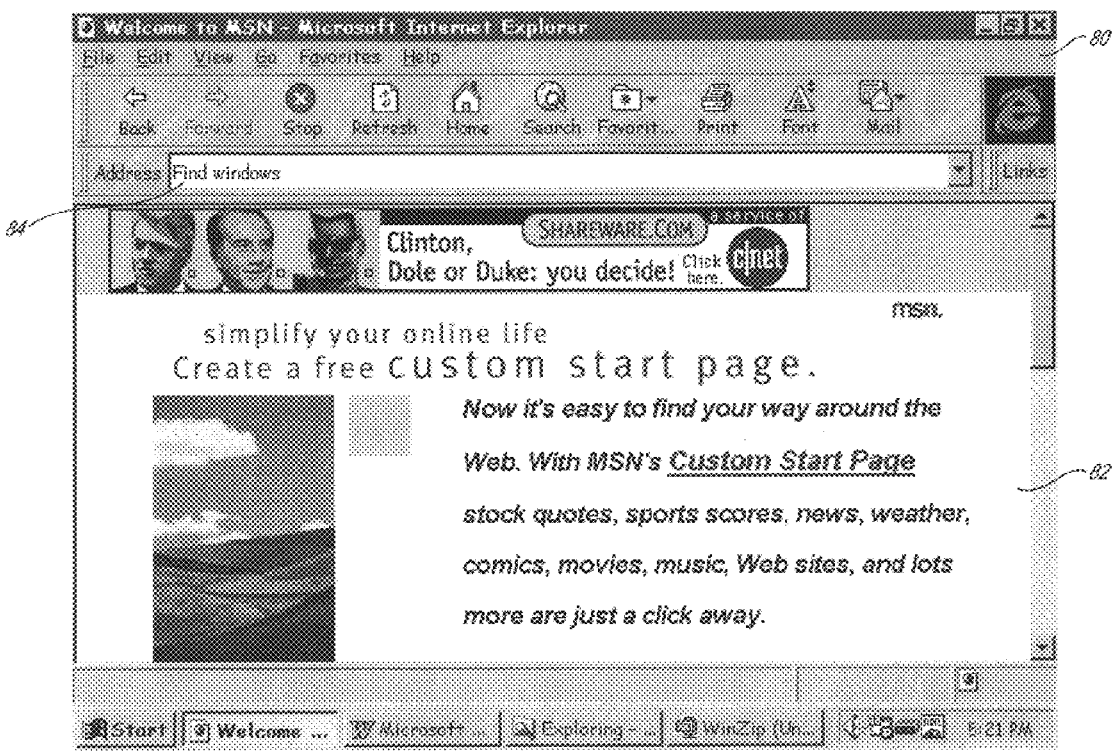
FIG. 11A illustrates the web browser user interface where a user has entered "Find windows" in the Address box.
Figure 11B:
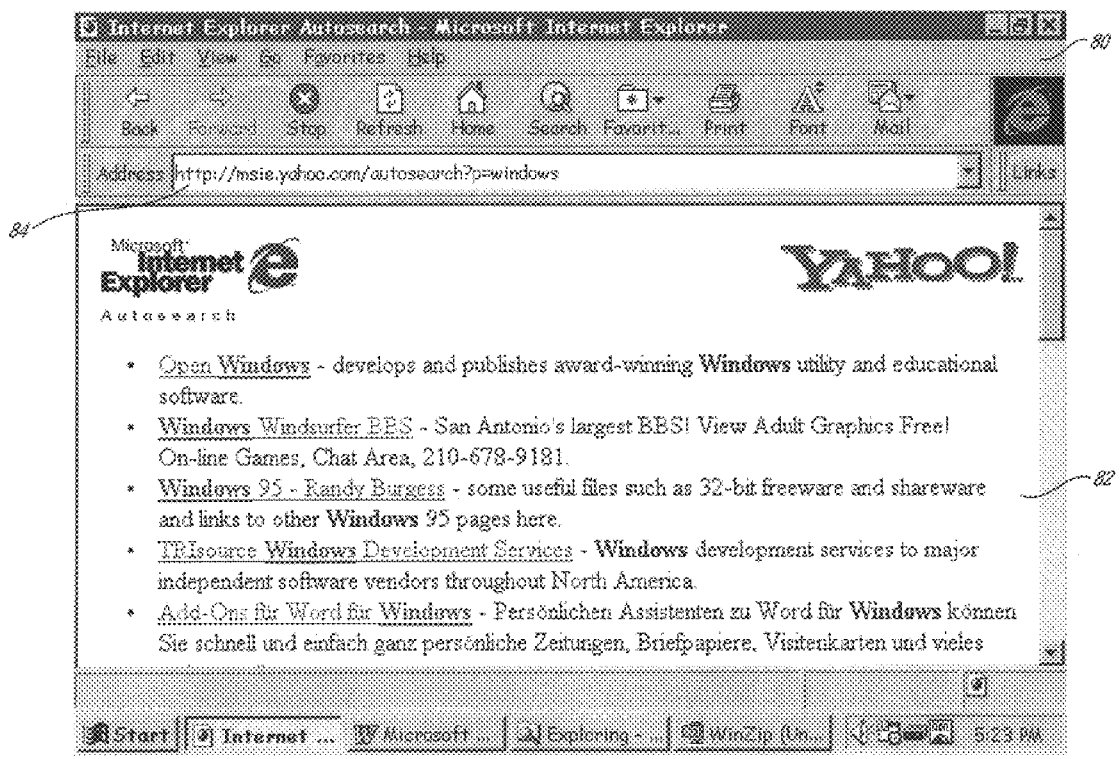
FIG. 11B illustrates an example of the web browser user interface after search results have been returned in response to the text shown in FIG. 11A being entered in the Address box.

The template passes the processed text to the search engine at a server 34 as a search query in the <searchpart> of the URL. FIG. 8A illustrates a first alternative regarding how the search engine responds to being passed the search terms as part of a search query. In this first alternative, the search engine produces search results using the text as search terms for a search query (step 96 in FIG. 8A). The search engine (FIG. 3) then sends the search results in an HTML document to the client computer 30 (step 98 in FIG. 8A). The web browser 42 displays the document in the client area 82 of the web browser window 80 (step 100 in FIG. 8A). FIG. 10A shows an example where a user has entered the text "go WWW" in the Address box. The web browser 42 processes this text and drops the prefix "go". As a result, the text "WWW" is inserted into the template to produce the URL "http://msie.yahoo.com/autosearch?p=WWW". FIG. 10B shows the web page holding the search results in the client area 82 of the web browser window 80. FIG. 11A shows a second example where a user has entered the text "Find windows" in the Address box 84 of the web browser window 80. The system processes the text to drop the prefix "Find". The remaining text "windows" is added into the template and search results are produced in the client area 82 of the web browser window 80 as shown in FIG. 11B.

Figure 8B:
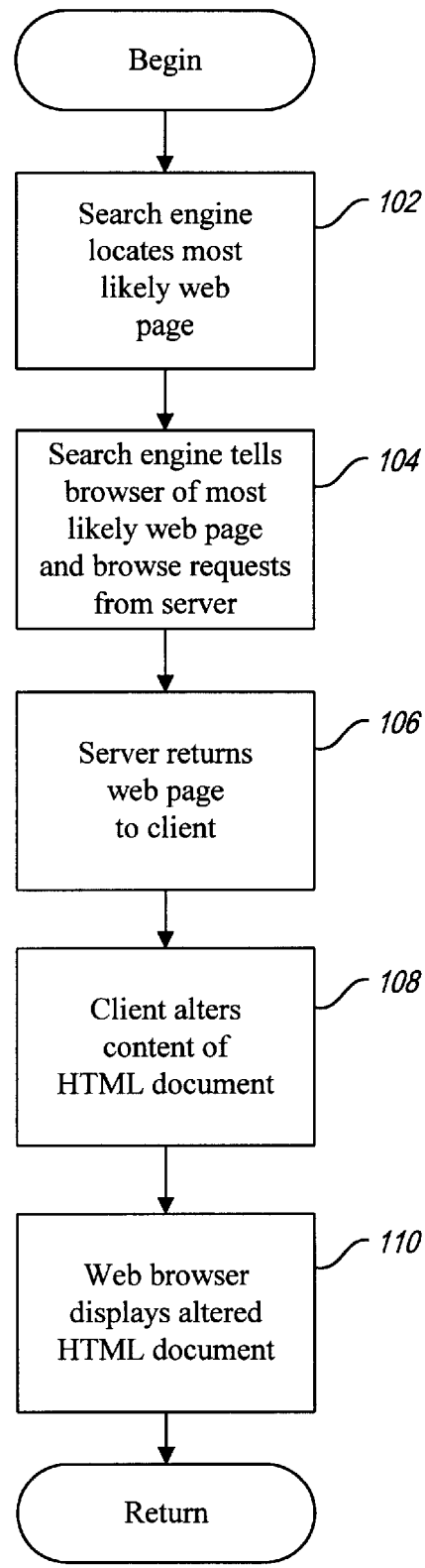
FIG. 8B illustrates a flowchart of the steps performed when a web page holding desired content is returned in response to the user entering text in the Address box that is not a URL.

A second alternative is depicted in FIG. 8B. In this second alternative, instead of returning search results, the search engine calls the server for the highest scoring web site in the search results. In this second alternative, the search engine initiates a search using the terms that were passed in the template to produce search results. These search results are scored or weighted. The scoring attempts to identify which search results are most likely to be of interest to the user. The search engine locates the highest scoring web page as the most likely web page desired by the user (step 102 in FIG. 8B). The search engine then tells the browser of the server that holds the most likely web page so that the browser may request that the web page be forwarded to the client computer 30 (step 104 in FIG. 8B). The server returns the web page to the client computer (step 106 in FIG. 8B). The web browser 42 includes codes for opening and modifying the contents of the elements contained within the HTML document of the web page. The web browser code then alters the content of the web page document if desired (step 108 in FIG. 8B). Specifically, the web page may be opened to highlight search terms within the web page. The web browser 42 then displays the altered HTML document for the web page in the client area 82 of the web browser window 80 (step 110 in FIG. 8B).

Those skilled in the art will appreciate that the code at the client computer may contain additional code for modifying the contents of the HTML documents that are returned from the servers. In an environment that supports Microsoft OLE, the client code may expose the OLE automation object of the HTML elements of the document to allow these objects to be dynamically changed.

Figure 9:
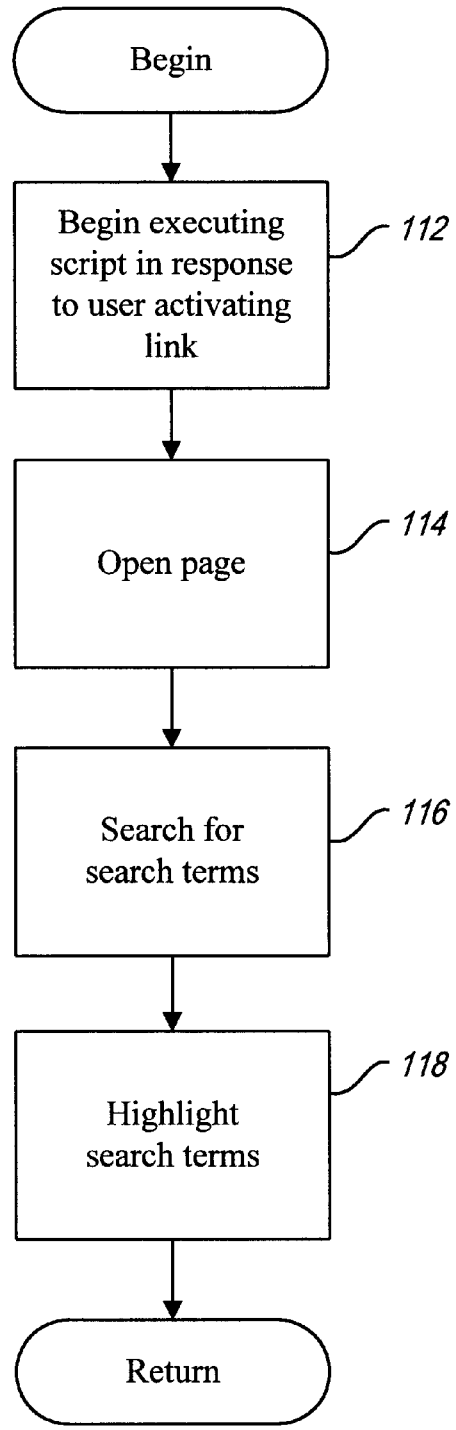
FIG. 9 is a flowchart illustrating the steps that are performed to automatically highlight search terms in a web page.

FIG. 9 illustrates another alternative in which search results are returned from the search engine but the search results do not merely contain hyperlinks. In this alternative, a server with a search engine generates a script that is executed by the client code when a user selects one of the hyperlinks. As shown in FIG. 9, the script is executed in response to a user activating one of the links (step 112 in FIG. 9). The script causes the web page to be opened (step 114 in FIG. 9). The web page is then searched to locate the search terms that were passed to the search engine (step 116 in FIG. 9). The search terms are highlighted within the HTML document for the web page (step 118 in FIG. 9). Those skilled in the art will appreciate that these scripts may perform additional functionality other than causing search terms to be highlighted within the web page documents.

Figure 12:
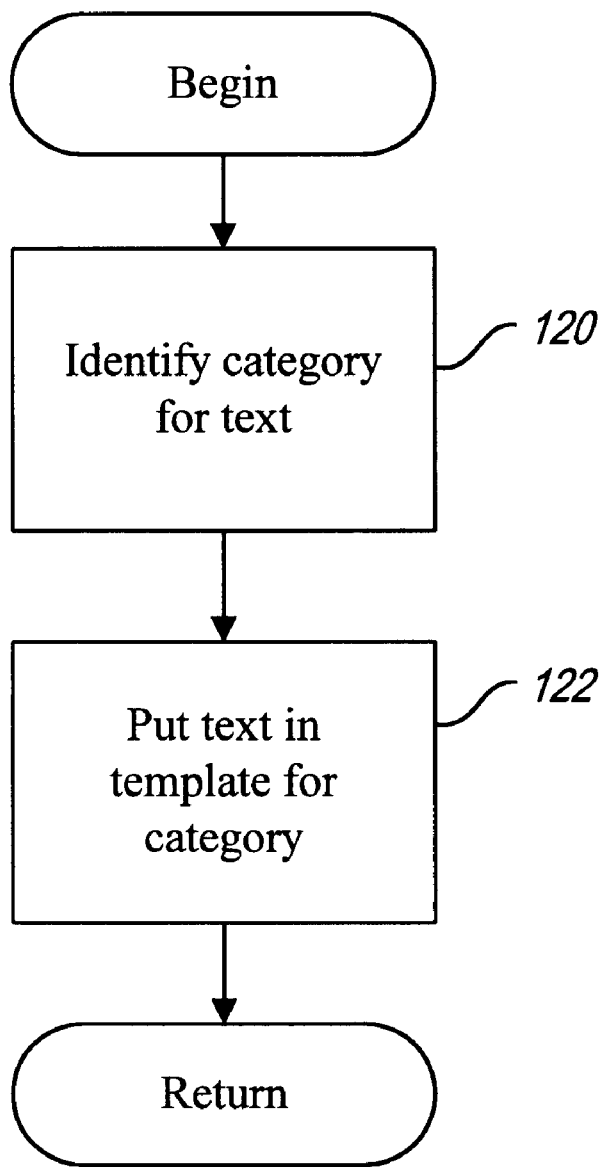
FIG. 12 is a flowchart illustrating the steps that are performed to select a search engine based upon category of textual input.

As mentioned above, the registry 46 may include multiple entries for multiple search engines. FIG. 12 is a flowchart that illustrates one alternative in which the identity of the search engine that is called depends upon the category of text that is entered. The first step performed by the web browser is to identify a category for the text that is entered within the Address box 84 (FIG. 5) so that the appropriate search engine may be called (step 120 in FIG. 12). Suppose that a user typed "phoneshari". The web browser would identify this as requesting a phone number, which constitutes one of the categories. Hence, the text "shari" would be passed to a search engine that returns phone numbers as search results. Accordingly, the text is put into the template for the category that calls the desired search engine (step 122 in FIG. 12).

Figure 13A:
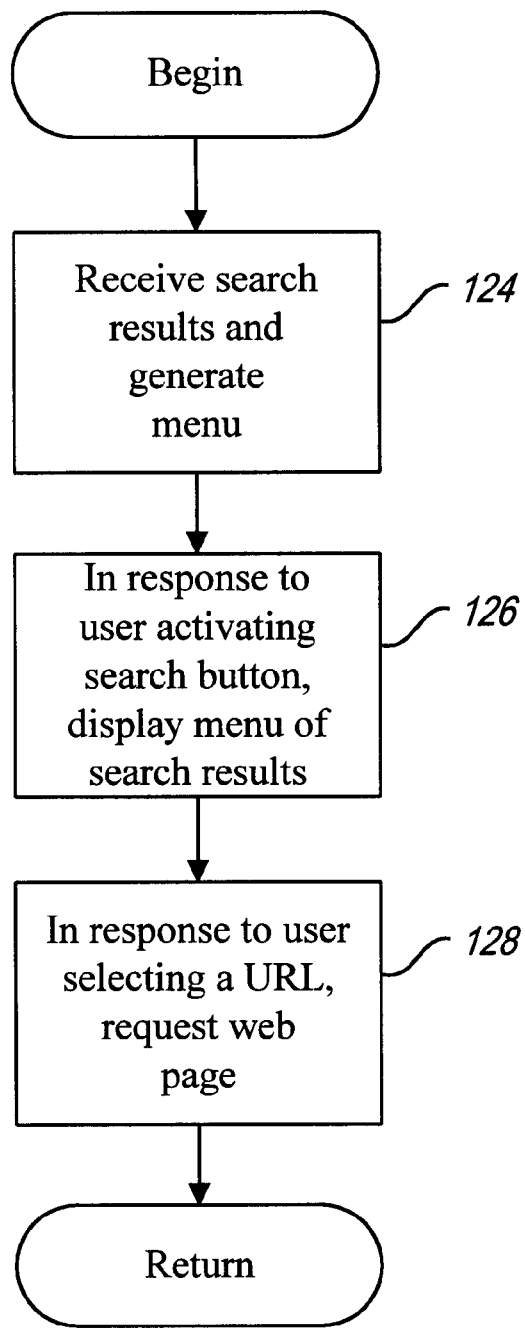
FIG. 13A is a flowchart that illustrates the steps that are performed when a menu is used to display the search results.
Figure 13B:
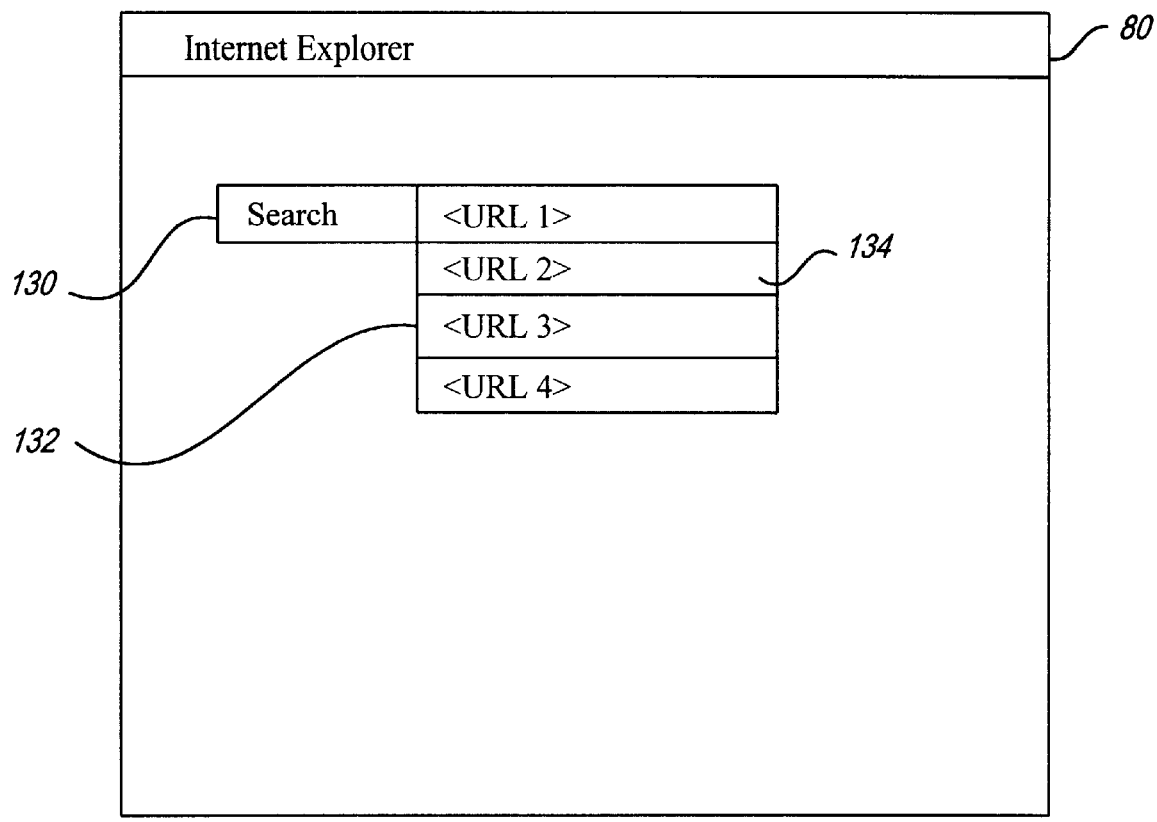
FIG. 13B illustrates an example of a user interface for the Web browser when a menu is used to hold search results.

The above description has described an instance wherein the search results are displayed within a client area 82 of the web browser window 80. It should be appreciated that the search results may also be displayed in different types of user interface elements. FIGS. 13A and 13B illustrate one alternative where the search results are used to populate a menu that is displayed in response to the activation of a search button. The web browser 46 receives the search results from the search engine and creates a menu to hold the search results (step 124 in FIG. 13A). The menu may hold a menu item for each web page in the search results. The menu item may specify the URL of the web page or some other identifier that identifies the web page. The web browser includes a search button 130 (see FIG. 13B) that may be activated by a user, such as by positioning a mouse cursor over the search button and clicking the mouse 52. This activation of the search button causes the menu of search results 132 to be displayed (step 126 in FIG. 13A). The menu includes menu items 134 that identify the web pages of the search results. In the example shown in FIG. 13B, the URLs for the associated web pages are displayed as the menu items. The user then selects one of the URLs, such as by positioning the mouse cursor over one of the menu items 134 and clicking the mouse. In response to the user selecting one of the URLs, the web browser 46 generates a request for the associated web page (step 128 in FIG. 13A). The server that holds the web page may then return a copy of the web page to the web browser 46 for the web browser to display.

Those skilled in the art will appreciate that the search results may also be incorporated into other user interface elements other than a menu. Moreover, the present invention is not limited to instances where a search button is utilized.

Those skilled in the art will appreciate that not all of the search results generated by the search engine need to be returned to the user; rather, a subset of the search results may be returned to the user in instances where a large number of hits occur. Typically, the highest scoring or highest weighting search pages will be forwarded to the user.

While the present invention has been described with reference to a preferred embodiment thereof, those skilled in the art will appreciate that various changes in form and detail may be made without departing from the intended scope of the present invention as defined in the appended claims.

We claim:

1. In a computer system having an output device, an input device and a connection to enable communication with a plurality of web sites, a method comprising:

(a) providing a user interface element on the output device adapted for a user to specify text that identifies a uniform resource locator (URL) of a given web site holding media to gain access to the given web site;

(b) in response to text that is specified via the user interface element, determining that the text is not a URL;

(c) in response to determining that the text is not a URL, examining the text and based on a determined meaning of the content of the text determining at least one of a plurality of search engines to search for a web site related to the text, passing at least a portion of the text to a determined search engine; and (d) in response to passing at least a portion of the text to the determined search engine, receiving media back from a web site that the determined search engine located using the text passed to the determined search engine.

2. The method of claim 1, wherein the method is performed by a web browser.

3. The method of claim 1, wherein the user interface element includes a text box for specifying the text by entering the text in the text box through the input device.

4. The method of claim 1, wherein receiving media further comprises receiving a hypertext document.

5. The method of claim 4, wherein the hypertext document is a hyper text mark-up language (HTML) document.

6. The method of claim 1, wherein receiving media comprises receiving audio information.

7. The method of claim 1, wherein the determined search engine conducts a search of the plurality of web sites using the text that is passed to it such that the plurality of web sites are scored as to the likelihood of user interest and the media is returned from the web site having a score indicating the greatest likelihood of user interest.

8. The method of claim 1, wherein text is determined to not be a URL when the text contains a space.

9. The method of claim 1, wherein text is determined to not be a URL when the text lacks a slash character.

10. The method of claim 1, wherein text is determined to not be a URL when the text does not specify a protocol.

11. The method of claim 1, wherein the plurality of web sites include at least one web site on an Internet.

12. The method of claim 1, wherein the plurality of web sites include at least one web site on an intranet.

13. In a computer system having a display device and a client that can communicate with a server, a method comprising:

(a) examining the content of text when the text received from a user input element does not include an identifier for a web page, and based on a determined meaning of the text determining at least one of a plurality of search engines to search for an identifier of at least one web page that is related to the determined meaning of the text;

(b) receiving the identifier of the related web page from the determined search engine, the determined search engine employing the determined meaning of the text to find the identifier of the related web page;

(c) initiating a request for the web page from the client to the server, the request including the identifier of the related web page;

(d) returning a copy of the related web page to the client from the server;

(e) at the client, transparently to the user, opening the related web page and modifying contents of the related web page; and (f) displaying the modifications to the related web page to the user.

14. The method of claim 13, wherein the request is for the web page that includes at least one search terms and wherein the modifying comprises highlighting each occurrence of at least one search term in the web page.

15. The method of claim 14, wherein each occurrence of at least one of a plurality of search terms is highlighted in the web page.

16. The method of claim 13, wherein the computer system provides a user interface element for specifying text as the identifier of the web page, and wherein the request is initiated in response to text specified in the user interface element that is not a proper identifier of the web page.

17. The method of claim 16, wherein the user interface element is intended for entering text that is a uniform resource locator (URL) for the web page, and wherein the request is initiated in response to the entering of text in the user interface element that is not a proper URL.

18. In a computer system having an output device, and a connection for calling a plurality of search engines that search for web sites, a method comprising:

(a) providing a user interface element on the output device adapted for a user to specify text as an identifier of a given web site to gain access to the given web site;

(b) in response to text specified via the user interface element, determining that the specified text is not a valid identifier of the given web site;

(c) in response to determining that the specified text is not a valid identifier of the given web site, examining the specified text and based on a determined meaning of the specified text determining at least one of the plurality of search engines to locate the identifier of at least one web site related to the determined meaning of the specified text; and (d) calling the determined search engine and forwarding at least a portion of the specified text to the determined search engine so that the identifier of the web site related to the determined meaning of the specified text can be returned by the determined search engine to the user.

19. The method of claim 18, wherein the user interface element enables the text to be specified as a uniform resource locator (URL), and wherein the specified text is determined to not be a valid URL.

20. The method of claim 18, wherein the determined meaning of the specified text is examined to categorize what type of search is to be conducted, and wherein the determining of what search engine to call is based on the categorization of the type of search.

21. The method of claim 18, wherein the determined search engine is disposed at a remotely located server.

22. The method of claim 18, wherein the user interface element includes a text box for entering the text.

23. The method of claim 18, further comprising returning search results to the computer system from the determined search engine in response to the calling of the determined search engine.

24. The method of claim 23, wherein the search results include a script for performing at least one event relative to the determined web site, one event being the highlighting of each occurrence of a search term in a web page from the determined web site.

25. The method of claim 18, further comprising returning from the determined search engine to the computer system a web page that contains at least a portion of the text that was forwarded to the determined search engine in response to the calling of the determined search engine.

26. The method of claim 18, wherein the method is performed by a web browser.

27. In a computer system having an output device, an input device and a connection to enable communication with a plurality of web sites, a method comprising:

(a) providing a user interface element on the output device adapted for a user to specify text for a uniform resource locator (URL) of a given web site holding media to gain access to the given web site;

(b) providing a registry having registry entries for calling at least one of a plurality of search engines to search for the given web site;

(c) in response to text specified via the user interface element, determining that the text is not a URL;

(d) in response to determining that the text is not a URL, examining the content of the text and based on the content of the text determining at least one of the plurality of search engines to search for a web site related to the text and passing at least a portion of the text to a determined search engine by accessing the registry entry for the determined search engine; and (e) in response to passing at least a portion of the text to the determined search engine, receiving media back from the web site related to the text that the determined search engine located using the text passed to the determined search engine.

28. The method of claim 27 wherein the registry entry for the search entry is a template that includes a replaceable section for passing a search term to the search entry and wherein the method replaces the replaceable section with the portion of the text that is passed to the determined search engine.

29. In a computer system having an output device, an input device and a connection to enable communication with a plurality of web sites, a computer-readable medium holding computer-executed instructions for performing a method comprising:

(a) providing a user interface element on the output device adapted for a user to specify text for a uniform resource locator (URL) of a given web site holding media to gain access to the given web site;

(b) in response to text specified via the user interface element, determining that the text is not a URL;

(c) in response to determining that the specified text is not a URL, examining the specified text and based on a determined meaning of the specified text determining at least one of a plurality of search engines to search the plurality of web sites for a web site related to the determined meaning of the specified text, passing at least a portion of the specified text to a determined search engine; and (d) in response to passing at least a portion of the specified text to the determined search engine, receiving media back from the web site related to the specified text that the determined search engine located using the specified text passed to the determined search engine.

30. The computer-readable medium of claim 29, wherein at least a portion of the instructions activate a web browser.

31. The computer-readable medium of claim 29, wherein the user interface element includes a text box for specifying text that is entered in the text box through the input device.

32. The computer-readable medium of claim 29, wherein receiving media comprises receiving a hypertext document.

33. The computer-readable medium of claim 32, wherein the hypertext document is a hypertext mark-up language (HTML) document.

34. The computer-readable medium of claim 29, wherein receiving media comprises receiving audio information.

35. The computer-readable medium of claim 29, wherein the determined search engine conducts a search of the plurality of web sites using the text that is passed to it such that the plurality of web sites are scored as to a likelihood of user interest and the media is returned from a selected web site having a score indicating a greatest likelihood of interest to a user.

36. The computer-readable medium of claim 29, wherein text is determined to not be a URL when the text contains a space.

37. The computer-readable medium of claim 29, wherein text is determined to not be a URL when the text lacks a slash character.

38. The computer-readable medium of claim 29, wherein text is determined to not be a URL when the text does not specify a protocol.

39. The computer-readable medium of claim 29, wherein the plurality of web sites include at least one web site on an Internet.

40. The computer-readable medium of claim 29, the plurality of web sites include at least one web site on an intranet.

41. In a computer system having a display device and a client that can communicate with a server, a computer-readable medium holding computer-executable instructions for performing a method comprising:

(a) receiving text associated with a web page;

(b) examining the content of the text when the text is not a uniform resource locator (URL), and based on a determined meaning of the content of the text determining at least one of a plurality of search engines to search for the URL of the web page;

(c) initiating a request for the web page from the client to the server with the URL for the web page that the determined search engine located using the text;

(d) returning a copy of the web page to the client from the server;

(e) at the client, transparently to the user, opening the web page and modifying contents of the web page; and (f) displaying the modified contents of the web page to the user on the display device.

42. The computer-readable medium of claim 41, wherein the request for the web page includes at least one search term, and wherein the modifying contents of the web page comprise highlighting any occurrences of at least one search term in the web page.

43. The computer-readable medium of claim 42, wherein each occurrence of at least one of a plurality of search terms is highlighted in the web page.

44. In a computer system having an output device, and a connection for calling at least one of a plurality of search engines that search for at least one of a plurality of web sites, a computer-readable medium holding computer-executable instructions for performing a method comprising the computer-implemented steps of:

(a) providing a user interface element on the output device adapted for a user to specify text associated with an identifier of a given web site to gain access to the given web site;

(b) in response to text specified via the user interface element, determining that the text is not valid as the identifier of the given web site;

(c) in response to determining that the text is not valid as the identifier of the given web site, examining the text and based on a determined meaning of the text determining which of the plurality of search engines to call; and (d) calling the determined search engine and forwarding at least a portion of the text to the determined search engine.

45. The computer-readable medium of claim 44, wherein the user interface element enables the text to specify a uniform resource locator (URL) as the identifier and wherein it is determined that the text does not specify a valid URL.

46. The computer-readable medium of claim 44, wherein the text is examined to categorize what type of search is to be conducted, and wherein the determining of what search engine to call is based on the categorization of the type of search.

47. The computer-readable medium of claim 44, further comprising receiving search results back from the search engine, the search results including a script for performing at least one event relative to the determined web site, one event being the highlighting of a search term in a web page from the determined web site.

48. In a computer system having an output device, an input device and a connection to enable communication with a plurality of web sites, a computer-readable medium holding computer-executable instructions for performing a method comprising the computer-implemented steps of:

(a) providing a user interface element on the output device adapted for a user to specify a uniform resource locator (URL) of a given web site holding media to gain access to the given web site;

(b) providing a registry having registry entries for calling at least one of a plurality of search engines to search the plurality of web sites;

(c) in response to text specified via the user interface element, determining that the text is not a URL;

(d) in response to determining that the text is not a URL, examining the content of the text and based on the content of the text determining at least one of the plurality of search engines to search for the given web site and passing at least a portion of the text to a determined search engine by accessing the registry entry for the determined search engine; and (e) in response to passing at least a portion of the text to the determined search engine, receiving media back from at least one of the plurality of web sites that the determined search engine located using text passed to the determined search engine.

49. The computer-readable medium of claim 48, wherein the registry entry for the search entry is a template that includes a replaceable section for passing a search term to the search entry and wherein the method replaces the replaceable section with the portion of the text that is passed to the determined search engine.

50. A method for automatically selecting a search engine to search a plurality of web sites based on a determined meaning of text when the text is determined to not be a uniform resource locator (URL) for a web site, the selected search engine returning media from a web site related to the text, comprising:

(a) determining whether the text includes a URL of a web site;

(b) passing text that is determined to include the URL of the web site to a search engine for locating the web site identified by the URL, the search engine returning media back from the web site identified by the URL;

(c) determining a meaning of text that is determined to not include the URL of the web site and based on the determined meaning of the text selecting at least one of a plurality of search engines to search for at least one web site that is related to the determined meaning of the text, a search engine being selected to be suited to search on the determined meaning of the text; and (d) passing at least a portion of the text to the determined search engine so that the selected search engine returns media from at least one web site that is related to the determined meaning of the text.

51. The method of claim 50, wherein determining the meaning of the text, further comprises determining a category of the text.

* * * * *

UNITED STATES PATENT AND TRADEMARK OFFICE
CERTIFICATE OF CORRECTION

PATENT NO. : 6,009,459
DATED : December 28, 1999
INVENTOR(S) : J.D. Belfiore et al.

It is certified that error appears in the above-identified patent and that said Letters Patent is hereby corrected as shown below:

<u>Column 4,</u>
Line 49, "memory" should read --memory 38--
Line 49, after "web browser 42" insert --.--
Line 49, "memory" should read --memory 38--

<u>Column 9,</u>
Line 52, "terms" should read term,--

Signed and Sealed this

Twenty-fourth Day of July, 2001

Attest:

Nicholas P. Godici

NICHOLAS P. GODICI
Attesting Officer *Acting Director of the United States Patent and Trademark Office*